United States Patent [19]

Furukawa

[11] Patent Number: 4,553,409
[45] Date of Patent: Nov. 19, 1985

[54] MULTIPLE REGENERATION MULTIPLE ABSORPTION TYPE HEAT PUMP

[75] Inventor: Tetsuro Furukawa, Suita, Japan

[73] Assignee: Hitachi Zosen Corporation, Osake, Japan

[21] Appl. No.: 630,208

[22] Filed: Jul. 12, 1984

[51] Int. Cl.$^4$ .............................................. F25B 15/00
[52] U.S. Cl. ..................................................... 62/476
[58] Field of Search ......................... 62/476, 144, 145

[56] References Cited

U.S. PATENT DOCUMENTS

| | | | |
|---|---|---|---|
| 2,021,994 | 11/1935 | Hainsworth | 62/144 |
| 2,353,714 | 7/1944 | Kleen | 62/144 X |
| 3,742,728 | 7/1973 | Mamiya | 62/476 |
| 3,831,397 | 8/1974 | Mamiya | 62/426 |

Primary Examiner—Lloyd L. King
Attorney, Agent, or Firm—Barnes, Kisselle, Raisch, Choate, Whittemore & Hulbert

[57] ABSTRACT

A multiple regeneration multiple absorption type heat pump having a multiple absorption system and a multiple regeneration system and adapted so that a refrigerant and an absorbent are circulated between the two systems and so that a fluid to be heated is passed therethrough the multiple absorption system comprises an evaporator for evaporating the refrigerant by a heat from an external low-temperature heat source, at least one absorbing/evaporating unit for allowing the absorbent to absorb the refrigerant vapor from the evaporator or a preceding similar absorbing/evaporating unit and for evaporating the refrigerant by the heat of absorption, and an absorber for allowing the absorbent to absorb the refrigerant vapor from the or a preceding absorbing/evaporating unit and for heating the to-be-heated fluid by the heat of absorption. The multiple regeneration system comprises a regenerator for evaporating the refrigerant contained in the absorbent by a heat from an external high-temperature heat source and thereby condensing the absorbent, at least one condensing/regenerating unit for condensing the absorbent by the latent heat of the refrigerant vapor from the regenerator or a preceding similar condensing/regenerating unit, and a condenser for heating the fluid being heated by the latent heat of the refrigerant vapor from the or a preceding condensing/regenerating unit. According to this arrangement, the fluid to be heated can be heated up over a wide temperature range through heat exchange at high temperatures.

9 Claims, 4 Drawing Figures

MULTIPLE REGENERATION MULTIPLE ABSORPTION TYPE HEAT PUMP

The present invention relates to an absorption type heat pump for heating a fluid to be heated by a combination of a refrigerant and an absorbing liquid.

The extent of temperature rise achievable by an absorption type heat pump with respect to a fluid to be heated cannot exceed the equilibrium temperature difference between a refrigerant and an absorbing liquid under same pressure. For example, in a conventional heat pump using water and lithium bromide in combination as refrigerant and absorbing liquid respectively, the achievable temperature rise is 50° C. at most. As such, with a view to making it possible to obtain a greater extent of temperature rise, a water-lithium bromide system heat pump having a multi-stage absorber has been proposed, but the adoption of multiple absorption stages poses a problem of the thermal efficiency being considerably lowered.

Accordingly, the object of the present invention is to provide a heat pump which is able to heat up the fluid being heated over a wide temperature range and which, nevertheless, provides good thermal efficiency.

To this end, the invention provides a multiple regeneration multiple absorption type heat pump having multiple absorption means and multiple regeneration means and adapted so that a refrigerant and an absorbent are circulated between said two means and so that a fluid to be heated is passed therethrough: said multiple absorption means comprising an evaporator for evaporating the refrigerant by a heat from an external low-temperature heat source, at least one absorbing/evaporating unit for allowing the absorbent to absorb the refrigerant vapor from said evaporator or a preceding similar absorbing/evaporating unit and for evaporating the refrigerant by the heat of absorption, and an absorber for allowing the absorbent to absorb the refrigerant vapor from the or a preceding absorbing/evaporating unit and for heating the to-be-heated fluid by the heat of absorption; said multiple regeneration means comprising a regenerator for evaporating the refrigerant contained in the absorbent by a heat from an external high-temperature heat source and thereby condensing the absorbent, at least one condensing/regenerating unit for condensing the absorbent by the latent heat of the refrigerant vapor from said regenerator or a preceding similar condensing/regenerating unit, and a condenser for heating the fluid being heated by the latent heat of the refrigerant vapor from the or a preceding condensing/regenerating unit.

According to the above arrangement, the process of evaporation and absorption of the refrigerant is repeated a plurality of times in the multiple absorption means so that minor heat from the external low-temperature heat source is amplified at multiple stages and the fluid to be heated is heated at the final stage in the multiple absorption means. Whilst, in the mutiple regeneration means, heat from the external hot-temperature heat source is utilized at multiple stages for regeneration of the absorbent, and moreover, heat available at the final stage of the multiple regeneration means is utilized also for heating the fluid being heated. Therefore, it is possible to heat up the low-temperature heat supply and the fluid to be heated over a wide temperature range and at high thermal efficiency.

These and other features and advantages of the invention will be apparent from the following description of embodiments taken in connection with the accompanying drawings, in which.

Figure 1:
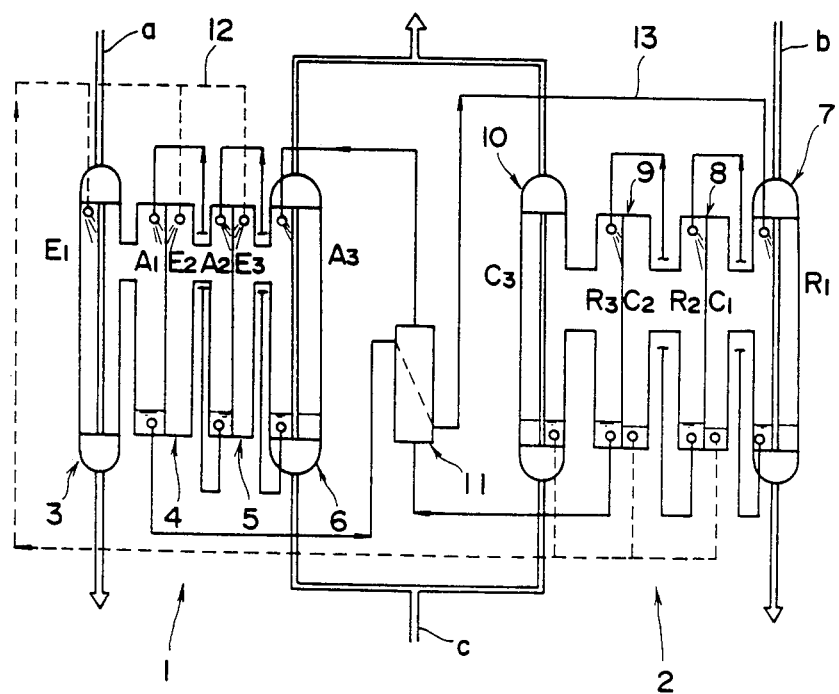
FIG. 1 is a schematic illustration showing a heat pump representing a first embodiment of the invention.

The heat pump shown in FIG. 1 consists broadly of multiple absorption means or system 1 and multiple regeneration means or system 2. The multiple absorption means comprise an evaporator 3 having an evaporating zone E1, first and second absorber/evaporators 4, 5 respectively having absorbing zones A1, A2 and evaporating zones E2, E3, and an absorber 6 having an absorbing zone A3. The multiple regeneration means 2 comprise a regenerator 7 having a regenerating zone R1, first and second condenser/regenerators 8, 9 respectively having condensing zones C1, C2 and regenerating zones R2, R3, and a condenser 10 having a condensing zone C3. A flow of refrigerant, e.g. water 12, is circulated between the multiple absorption means 1 and the multiple regeneration means 2, and a flow of absorbent, e.g. an aqueous solution of lithium bromide 13, is also circulated therebetween through a heat exchanger 11. Into the evaporator 3 and regenerator 7 are flowed an external low-temperature heat supply fluid a and an external high-temperature heat supply fluid b respectively. Fluids to be heated are flowed in parallel into the absorber 6 and condenser 10 respectively.

According to the above arrangement, the evaporator 3 allows the refrigerant 12 to be evaporated by the heat from the external low-temperature supply fluid a. The first absorber/evaporator 4 allows the refrigerant vapor produced in the evaporator 3 to be absorbed into the absorbent 13 introduced from the second absorber/evaporator 5 in the absorbing zone A1, a higher temperature heat developing in that process being utilized to evaporate the refrigerant 12 in the evaporating zone E2 so that a refrigerant vapor having a higher temperature and a higher pressure is obtained. The second absorber/evaporator 5 allows the refrigerant vapor from the first absorber/evaporator to be absorbed into the absorbent 13 introduced from the absorber 6 in the absorbing zone A2, and a higher temperature heat developing in that process is utilized to evaporate the refrigerant 12 in the evaporating zone E3, thus a higher-temperature, higher-pressure refrigerant vapor being produced. The absorber 6 allows the refrigerant vapor from the second absorber/evaporator to be absorbed into the absorbent introduced from the multiple multiple regeneration means 2 through the heat exchanger 11, and by a higher temperature heat generated in that process is heated the fluid being heated c.

The absorbent which has become dilute as a result of its absorption of refrigerant vapor is transferred from the absorbing zone A1 of the first absorber/evaporator 4 to the regenerator 7 through the heat exchanger 11. In the regenerator 7, refrigerant is evaporated from the absorbent 13 by the heat from the external high-temperature heat supply fluid b, whereby the absorbent 13 is concentrated. The first condenser/regenerator 8 allows the refrigerant vapor produced at the regenerator 7 to be condensed in the condensing zone C1. The absorbent 13 introduced from the regenerator 7 into the condenser/regenerator 8 is further concentrated by the latent heat of the refrigerant vapor in the regenerating zone R2. The refrigerant vapor produced in the regenerating zone R2 of the first condenser/regenerator 8 is condensed in the condensing zone C2 of the second condenser/regenerator 9. In the regenerating zone R3, the absorbent 13 introduced from the first condenser/regenerator 8 is further concentrated by the latent heat of the refrigerant vapor. The condenser C3 heats the being-heated fluid c through the latent heat of the refrigerant vapor produced in the second condenser/regenerator 9, and the refrigerant vapor is concentrated in that process. The condensed absorbent 13 is again introduced into the absorber 6 through the heat exchanger 11. The refrigerant 12 condensed at the first and second condenser/regenerators 8, 9 and the condenser 10 is fed to the evaporator 3 and also to the absorber/evaporators 4, 5.

Figure 2:
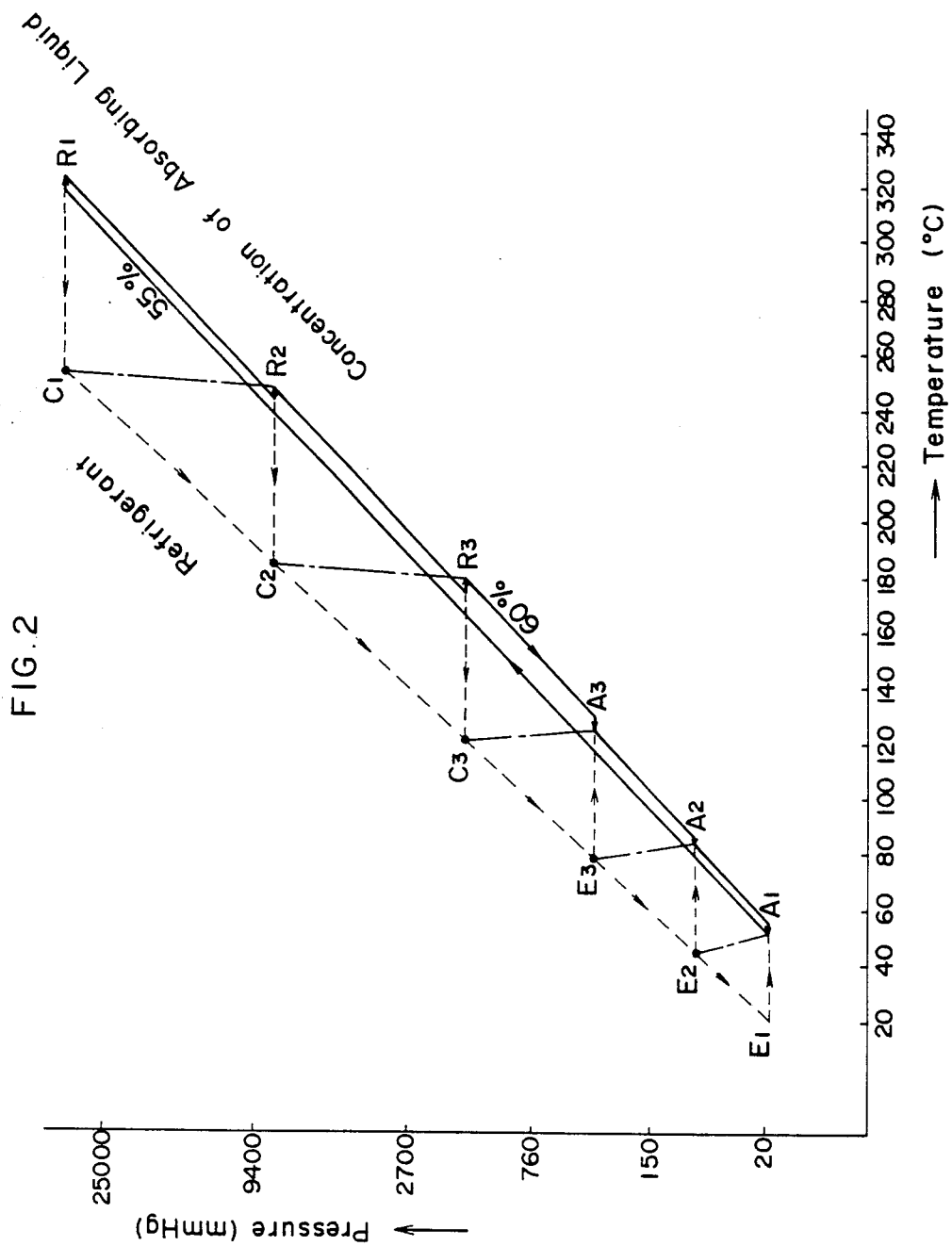
FIG. 2 is a graphic representation showing a temperature-pressure cycle in the heat pump.

FIG. 2 shows a temperature-pressure cycle in the case where water and an aqueous solution of lithium bromide are used as refrigerant 12 and absorbent 13 respectively in the embodiment of FIG. 1. As can be seen from the figure, in the process of the multiple absorption means 1, the temperature of the absorbent 13 rises as the step-by-step absorption of refrigerant vapor progresses, the temperature of the absorbent 13 reaching about 120° C. in the absorber 6 (absorbing zone A3) where heating of the fluid being heated c takes place. Whilst, in the multiple regeneration means 2, a large heat from the external high-temperature heat supply fluid b is utilized for step-by-step evaporation of the refrigerant 12 from the absorbent 13, that is, for step-by-step concentrating (purification or regeneration) of the absorbent 13, the temperature of the refrigerant vapor becoming lower as the condensation process advances, that is, in the sequence of C1-C2-C3. Yet, the refrigerant vapor introduced into the condenser 10 (condensing zone C3) has a temperature as high as about 120° C. Accordingly, by passing the to-be-heated fluid c, e.g. water, through both the absorber 6 and the condenser 10 is it possible to heat it to temperatures as high as 80°–120° C., thus generating a low-pressure steam.

Figure 3:
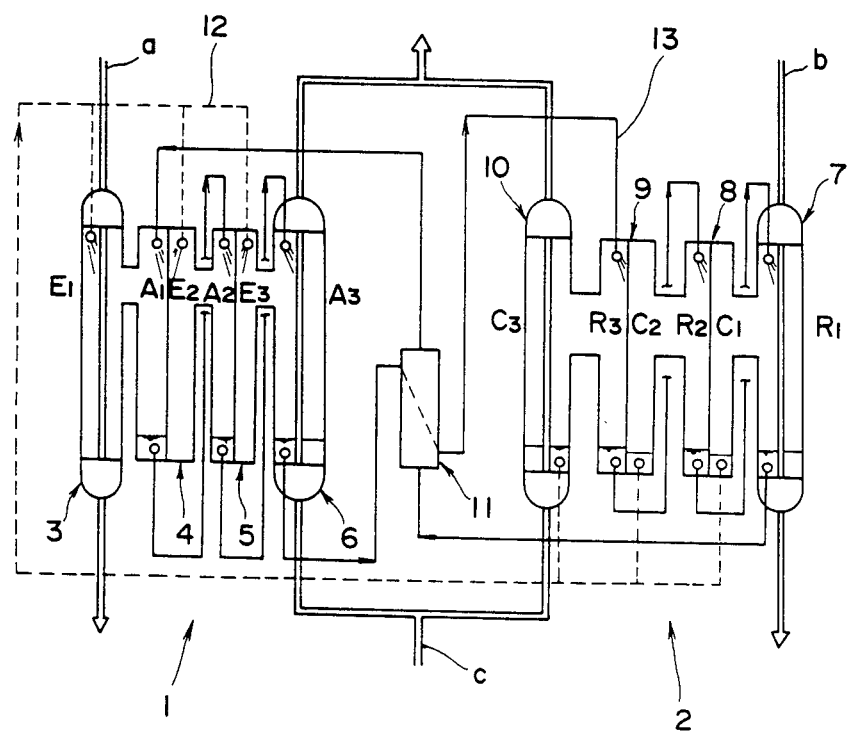
FIG. 3 is a schematic illustration showing a heat pump representing a second embodiment of the invention.

The embodiment shown in FIG. 3 differs from the one shown in FIG. 1 only in that the absorbent 13 is circulated through its path in the sequential order of heat exchanger 11, first absorber/evaporator 4, second absorber/evaporator 5, absorber 6, heat exchanger 11, second condenser/regenerator 9, first condenser/regenerator 8, and regenerator 7.

Figure 4:
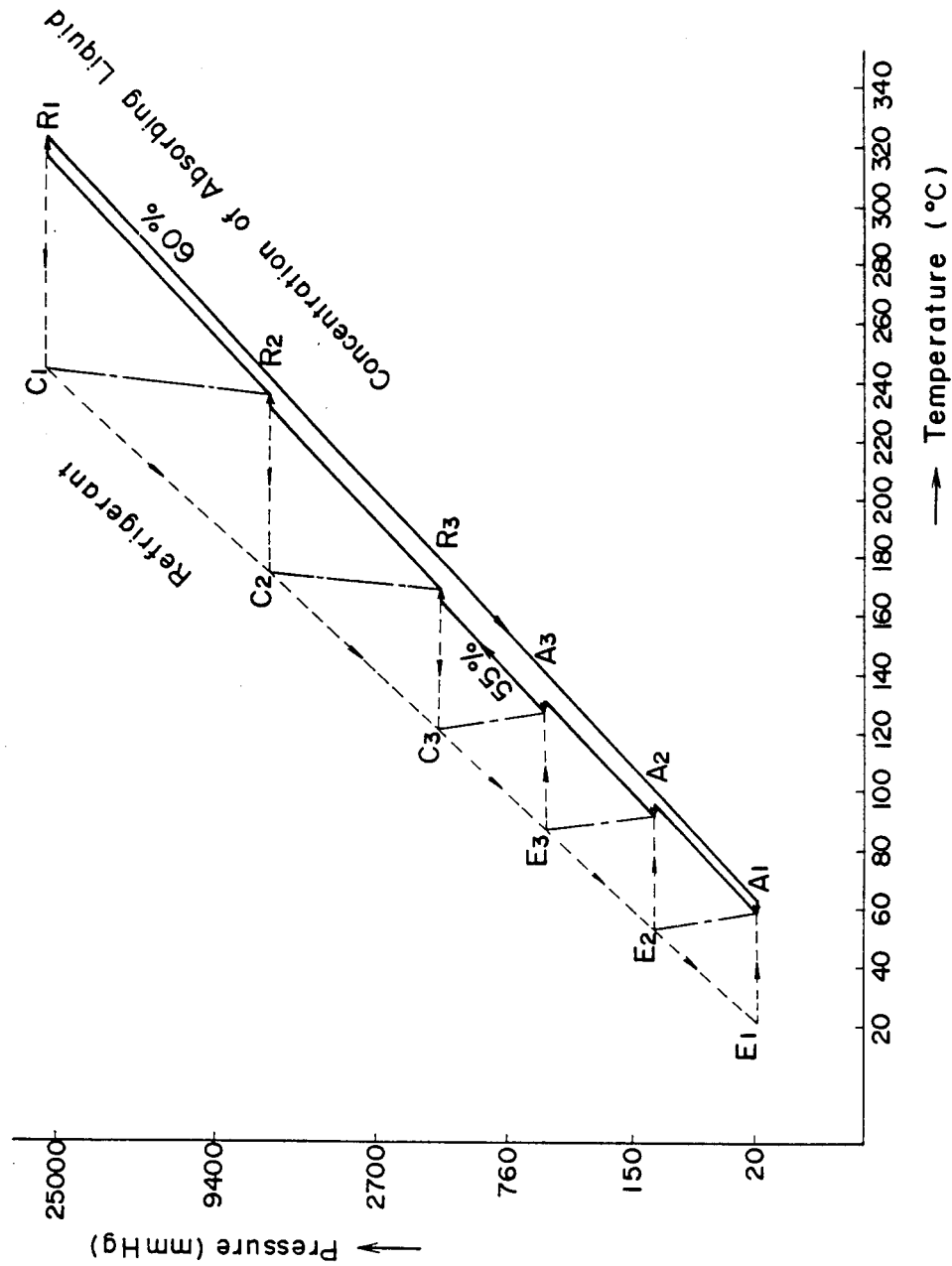
FIG. 4 is a graph showing a temperature-pressure cycle in the heat pump in FIG. 3.

FIG. 4 shows a temperature-pressure cycle in the case where water and an aqueous solution of lithium bromide are used as refrigerant 12 and absorbent 13 respectively in the embodiment of FIG. 3. Advantageous effects of the arrangement similar to those in the case of FIG. 2 can be seen from the graph.

It is to be noted that for the sake of simplicity a single heat exchanger 11 is shown in FIGS. 1 and 3, but in order to improve the efficiency of the system, a plurality of heat exchangers for effecting heat exchange between refrigerant 12 and absorbent 13 may be provided in the multiple absorption means 1 and multiple regeneration means 2. Also, it is possible to arrane so that the to-be-heated fluid c flows through the absorber 6 and condenser 10 in series.

For the purpose of external low-temperature heat supply a, 0°–60° C. heat from the environmental source (air or cooled water), or low-temperature waste heat may be utilized, and for external high-temperature heat supply b, heat at or above 250° C., such as steam, high-temperature waste heat, or combustion heat, may be utilized. Through utilization of such heat the to-be-heated fluid can be heated up to about 140° C., maximum.

What is claimed is:

1. A multiple regeneration multiple absorption type heat pump comprising multiple absorption means and multiple regeneration means between which a vaporizable liquid refrigerant and a liquid absorbent are circulated, wherein said multiple absorption means comprises
an evaporator for evaporating the refrigerant from said multiple regeneration means by the heat of an external low-temperature source,
one or more absorbing/evaporating units having an absorbing zone and an evaporating zone in heat conduction with said absorbing zone, said absorbing zone being adapted to allow the absorbent introduced thereinto to absorb the refrigerant vapor from said evaporator or the evaporating zone of a preceding absorbing/evaporating unit, said evaporating zone being adapted to evaporate the refrigerant from said multiple regeneration means by the heat of absorption produced in said absorbing zone, and
an absorber for allowing the absorbent introduced thereinto to absorb the refrigerant vapor from the evaporating zone of the or a preceding absorbing/evaporating unit, a heat receiving fluid being adapted to be at least partially passed through said absorber so as to be heated by the heat of absorption produced in said absorber, and
said multiple regeneration means comprises
a regenerator for concentrating the absorbent introduced thereinto by evaporating the absorbed refrigerant by the heat of an external high-temperature source,
one or more condensing/regenerating units having a condensing zone and a regenerating zone in heat conduction with said condensing zone, said condensing zone being adapted to condense the refrigerant vapor from said regenerator or the regenerating zone of a preceding condensing-/regenerating unit, said regenerating zone being adapted to concentrate the absorbent introduced thereinto by evaporating the absorbed refrigerant by the heat of condensation produced in said condensing zone, and
a condensor for condensing the refrigerant vapor from the regenerating zone of the or a preceding condensing/regenerating unit, said heat receiving fluid being adapted to be at least partially passed through said condenser so as to be heated by the heat of condensation produced in said condensor,
said multiple absorption means and said multiple regeneration means being so adapted that the temperature of said absorber is generally equal to the temperature of said condenser.

2. A heat pump as defined in claim 1 which further comprises a heat exchanger through which said absorbent passes in the course of its flow from said multiple absorption means to said multiple regeneration means and vice versa.

3. A heat pump as defined in claim 1 wherein said heat receiving fluid is divided into a first stream passed through said absorber and a second stream passed through said condenser, said first and second streams being joined into a single stream after passing through said absorber and said condenser respectively.

4. A heat pump as defined in claim 1 wherein said absorber receives the absorbent from the regenerating zone of the condensing/regenerating unit immediately preceding said condenser, and said regenerator receives the absorbent from the absorbing zone of the absorbing/evaporating unit immediately following said evaporator.

5. A heat pump as defined in claim 1 wherein the absorbing zone of the absorbing/evaporating unit immediately following said evaporator receives the absorbent from said regenerator, and the regenerating zone of the condensing/regenerating unit immediately preceding said condenser receives the absorbent from said absorber.

6. A heat pump as defined in claim 1 wherein said refrigerant is water, and said absorbent is an aqueous solution of lithium bromide.

7. A heat pump as defined in claim 1 wherein said low-temperature heat source has a temperature of 0°–60° C., and said high-temperature heat source has a temperature of not less than 250° C.

8. A heat pump as defined in claim 7 wherein said low-temperature source is environmental air or water or low-temperature waste.

9. A heat pump as defined in claim 7 wherein said high-temperature heat source is steam or high-temperature waste or combustion heat.

* * * * *